United States Patent
Lee et al.

(10) Patent No.: US 9,158,442 B2
(45) Date of Patent: Oct. 13, 2015

(54) ELECTRONIC DEVICE AND INTERFACE METHOD FOR CONFIGURING MENU USING THE SAME

(75) Inventors: Byunghun Lee, Seoul (KR); Jisuk Chae, Gyeonggi-do (KR); Kyunghee Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 13/232,779

(22) Filed: Sep. 14, 2011

(65) Prior Publication Data

US 2012/0096377 A1   Apr. 19, 2012

(30) Foreign Application Priority Data

Oct. 14, 2010   (KR) ................ 10-2010-0100496

(51) Int. Cl.
| | |
|---|---|
| G06F 3/048 | (2013.01) |
| G06F 3/0486 | (2013.01) |
| G06F 3/0488 | (2013.01) |
| G06F 3/0483 | (2013.01) |

(52) U.S. Cl.
CPC ............ *G06F 3/0486* (2013.01); *G06F 3/0483* (2013.01); *G06F 3/04883* (2013.01)

(58) Field of Classification Search
CPC ...... G06F 3/0488; G06F 3/0482; G06F 3/017
USPC .......................... 715/776, 810, 825
See application file for complete search history.

(56) References Cited

U.S. PATENT DOCUMENTS

| | | | |
|---|---|---|---|
| 5,140,678 A | 8/1992 | Torres | |
| 5,463,725 A | 10/1995 | Henckel et al. | |
| 6,061,058 A * | 5/2000 | Owens et al. | 715/769 |
| 6,211,856 B1 * | 4/2001 | Choi et al. | 345/666 |
| 6,618,063 B1 * | 9/2003 | Kurtenbach | 715/834 |
| 6,686,938 B1 * | 2/2004 | Jobs et al. | 715/835 |
| 6,762,775 B2 * | 7/2004 | Ho | 715/776 |
| 7,185,274 B1 * | 2/2007 | Rubin et al. | 715/205 |
| 7,386,804 B2 * | 6/2008 | Ho et al. | 715/776 |
| 7,576,756 B1 * | 8/2009 | Good et al. | 345/635 |
| 7,966,575 B1 * | 6/2011 | Jetha et al. | 715/817 |
| 8,155,881 B2 * | 4/2012 | Kaji et al. | 701/426 |
| 8,331,920 B2 * | 12/2012 | Lee et al. | 455/418 |

(Continued)

FOREIGN PATENT DOCUMENTS

| | | |
|---|---|---|
| CN | 101566918 A | 10/2009 |
| CN | 101794606 A | 8/2010 |

*Primary Examiner* — Amy M Levy
(74) *Attorney, Agent, or Firm* — Birch, Stewart, Kolasch & Birch, LLP

(57) ABSTRACT

According to an embodiment of the present invention, an interface method for controlling a menu on an electronic device includes displaying, on a screen of the electronic device, a plurality of service pages and at least one menu object attached to one of the plurality of service pages, receiving a menu configuration mode conversion command to change a configuration of at least one of the plurality of service pages, displaying, on the screen, a menu generating object in response to the received menu configuration mode conversion command, receiving a motion command to move the menu generating object, moving the menu generating object in response to the received motion command, receiving a drop command to attach the moved menu generating object on a particular service page among the plurality of service pages, and attaching the moved menu generating object to the particular service page in response to the drop command.

21 Claims, 16 Drawing Sheets

(56) References Cited

U.S. PATENT DOCUMENTS

| | | | |
|---|---|---|---|
| 2004/0027392 A1* | 2/2004 | Dunn et al. | 345/810 |
| 2004/0048607 A1* | 3/2004 | Kim | 455/418 |
| 2004/0174396 A1* | 9/2004 | Jobs et al. | 345/810 |
| 2004/0236774 A1* | 11/2004 | Baird et al. | 707/100 |
| 2005/0160374 A1* | 7/2005 | Bailey et al. | 715/830 |
| 2006/0212829 A1* | 9/2006 | Yahiro et al. | 715/810 |
| 2007/0245254 A1* | 10/2007 | Kwon et al. | 715/762 |
| 2009/0267909 A1 | 10/2009 | Chen et al. | |
| 2009/0271703 A1* | 10/2009 | Chu et al. | 715/702 |
| 2009/0271731 A1* | 10/2009 | Lin et al. | 715/776 |
| 2009/0288032 A1* | 11/2009 | Chang et al. | 715/776 |
| 2009/0311021 A1* | 12/2009 | Kiwada | 399/382 |
| 2010/0058214 A1 | 3/2010 | Singh et al. | |
| 2010/0100841 A1* | 4/2010 | Shin et al. | 715/784 |
| 2010/0175008 A1 | 7/2010 | Han et al. | |
| 2010/0306650 A1* | 12/2010 | Oh et al. | 715/702 |
| 2011/0283219 A1* | 11/2011 | Pandey | 715/776 |
| 2012/0026400 A1* | 2/2012 | Kang et al. | 348/570 |
| 2012/0089933 A1* | 4/2012 | Garand et al. | 715/765 |
| 2012/0304084 A1* | 11/2012 | Kim et al. | 715/762 |

* cited by examiner

ELECTRONIC DEVICE AND INTERFACE METHOD FOR CONFIGURING MENU USING THE SAME

CROSS REFERENCE TO RELATED APPLICATION

This application claims the benefit of the Korean Patent Application No. 10-2010-0100496, filed on Oct. 14, 2010, which is hereby incorporated by reference as if fully set forth herein.

BACKGROUND OF THE DISCLOSURE

1. Field of the Disclosure

The present invention relates to an electronic device and an interface method for configuring a menu, more particularly, to an electronic device providing an interface capable of generating and configuring a menu desired by a user and an interface method for configuring the menu.

2. Discussion of the Related Art

Electronic devices including broadcasting receivers, personal computers, notebooks, mobile phones and the like may be configured to perform a variety of functions. Such a variety of functions may be a broadcasting receiving function, data/audio communication function, a motion picture taking function by using cameras, an audio storing function, a music file playing function via a speaker system, an image or video displaying function and the like. Some terminals may further have an additional game implementing function.

In addition, such an electronic device has been under development to be slim for portable convenience and to have an input device such as a touch pad and a touch screen for operational convenience. A conventional electronic device performs corresponding operations, once the touch pad and the touch screen are touched. Those operations are corresponding to a user's selection on a display screen. Also, those operations may include paging, scrolling, panning, zooming and the like.

According to the touch pad, when a user's finger is moving along a surface of the touch pad, motion of an input pointer is corresponding to relative motion of the user's finger. In contrast, a touch screen is a kind of a display screen having a touch sensing transparent panel covering a screen. When using the touch screen, the user may select directly points GUI object on the display screen by a stylus or a finger, to select a corresponding GUI.

SUMMARY OF THE DISCLOSURE

Accordingly, the present invention is directed to an electronic device and an interface method for configuring a menu.

An object of the present invention is to provide an electronic device capable of generating a new menu item desired by a user at a position desired by the user, and an interface method for configuring a menu using the electronic device.

Another object of the present invention is to provide an electronic device capable of listing menu items in an order desired by a user without any difficulties, and an interface method for configuring a menu using the electronic device.

A further object of the present invention is to provide an electronic device capable of providing a screen comparing services and the quantity of contents related to menu items for each menu item, and an interface method for configuring a menu using the electronic device.

A still further object of the present invention is to provide a recordable medium capable of reading a program configured to implement the interface method for configuring the menu in a computer.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an interface method for configuring a menu comprising steps of: displaying a plurality of service pages and at least one menu object attached to one of the plural service pages on a screen; displaying a menu generating object on the screen, when a menu configuration mode conversion command is sensed; moving the menu generating object according to the sensed motion command, when detecting a motion command; identifying whether the sensed drop command is sensed on one of the plural service pages, when detecting a drop command; and attaching the moved menu generating object on the service page having the drop command sensed thereon, when detecting the drop command at the service page. At least predetermined area of the menu object may be attached on a service page. The menu object and the menu generating object may be displayed in a label shape. The plurality of the service pages may be displayed, with predetermined areas overlapped with each other.

The interface method for configuring the menu may further include steps of: identifying whether the moved menu generating object is located on at least one of the plural service pages; and enlarging and displaying an area of the at least one service page, when the moved menu generating object is located on the at least one service page.

The interface method for configuring the menu may further include steps of: identifying whether the moved menu generating object is located on at least one of the plural service pages; and enlarging and displaying an area of the plural service pages, when the moved menu generating object is located on the at least one service page.

The interface method for configuring the menu may further include steps of: activating input of a menu title for the menu generating object; and recognizing the menu generating object as menu object, when the menu title is inputted.

A sub-menu list listing sub-menu items of the menu object may be displayed, when a down event is detected in an area having the menu object located therein for a preset time period.

Contents related to the service page having the menu object attached thereto may be displayed, when a down event is detected in an area having the menu object located therein.

The number of service pages located between the menu object and a neighboring menu object may be increased or decreased according to increase or decrease of the number of service pages related to the menu object.

The interface method for configuring the menu may further include steps of moving a menu object according to the detected menu object motion command, when a menu object motion command is detected; identifying a position of the detected menu object drop command, when detecting a menu object drop command; and attaching the moved menu object to a service page having the menu object drop command sensed thereon, when detecting the menu object drop command on the service page.

The interface method for configuring the menu may further include a step of deleting the moved menu object, when the menu object drop command is detected at an area having the plural service pages not located therein.

At least one of the menu configuration mode conversion command, the motion command, the drop command, the menu object motion command or the menu object drop command may be sensed by a touch gesture or a space gesture.

In another aspect of the present invention, an interface method for configuring a menu includes steps of: displaying a plurality of service pages and at least one menu object attached to one of the plural service pages on a screen; displaying a menu generating object on the screen, when a menu configuration mode conversion command is sensed; selecting the menu generating object, when detecting a selection command; and attaching the selected menu generating object to a service page instructed by the positioning command, when detecting a positioning command. At least one of the menu configuration mode conversion command, the selection command or the positioning command may be sensed by a touch gesture or a space gesture.

In a further aspect of the present invention, an electronic device includes a display configured to display a plurality of service pages and at least one menu object attached to one of the plural service pages on a screen; and a controller configured to control a menu generating object to be displayed on the screen, when a menu configuration mode conversion command is sensed, and to select the menu generating object, when a selection command is sensed, and to attach the selected menu generating object to a service page instructed by the positioning command, when a positioning command is sensed. The plurality of the service pages may be displayed, with predetermined areas overlapped with each other.

The controller may move the menu generating object according to the sensed motion command, when a motion command is sensed; the controller may identify whether the moved menu generating object is located on at least one of the plural service pages; and the controller may control an area of the at least one service page to be enlarged and displayed.

The controller may move the menu generating object according to the sensed motion command, when a motion command is sensed; the controller may identify whether the moved menu generating object is located on at least one of the plural service pages; and the controller may control an area of the plural pages to be enlarged and displayed, when the moved menu generating object is located on the at least one service page.

The controller may control a sub-menu list listing sub-menu items of the menu object to be displayed, when a down event is sensed at an area having the menu object located therein for a preset time period.

The controller may controls contents related to a service page having the menu object attached thereto to be displayed, when a down event is sensed at an area having the menu object located therein.

The controller may control the number of service pages between the menu object and a neighboring menu object to be increased or decreased according to increase or decrease of the number of service pages related to the menu object.

The controller may select a menu object according to the sensed menu object selection command, when a menu object selection command is sensed, and the controller may attach the selected menu object to a service page instructed by the sensed menu object positioning command, when a menu object positioning command is sensed.

At least one of the menu configuration mode conversion command, the motion command, the selection command, the positioning command, the menu object selection command or the menu object positioning command may be sensed by a touch gesture or a space gesture.

According to the electronic device and the interface method for configuring the menu of the present invention, the user may generate menu items in a method of attaching labels to diary pages. As a result, the user may generate desired menu items at desired positions and he or she may change the order of menu items by a method of moving labels. As a result, he or she may list menu items in a desired order without any difficulties.

According to an embodiment of the present invention, an interface method for controlling a menu on an electronic device includes displaying, on a screen of the electronic device, a plurality of service pages and at least one menu object attached to one of the plurality of service pages, receiving a menu configuration mode conversion command to change a configuration of at least one of the plurality of service pages, displaying, on the screen, a menu generating object in response to the received menu configuration mode conversion command, receiving a motion command to move the menu generating object, moving the menu generating object in response to the received motion command, receiving a drop command to attach the moved menu generating object on a particular service page among the plurality of service pages, and attaching the moved menu generating object to the particular service page in response to the drop command.

According to an embodiment of the present invention, an interface method for configuring a menu includes displaying, on a screen of an electronic device, a plurality of service pages and a plurality of menu objects attached to the plurality of service pages, displaying, on the screen, a plurality of menu generating objects on the screen when a menu configuration mode conversion command is received, selecting one of the plurality of menu generating objects when a selection command is received, and attaching the selected menu generating object to a specific service page when a positioning command to attach the selected menu generating object at the specific service page is received.

According to an embodiment of the present invention, an electronic device includes a display configured to display a plurality of service pages and at least one menu object attached to one of the plurality of service pages on a screen of the display, and a controller configured to control at least one menu generating object to be displayed on the screen when a menu configuration mode conversion command is received, and to select one menu generating object among the displayed at least one menu generating object when a selection command is received, and to attach the selected menu generating object to a particular service page if the plurality of service pages when a positioning command to attach the selected menu generating object at the particular service page is received.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Figure 1:
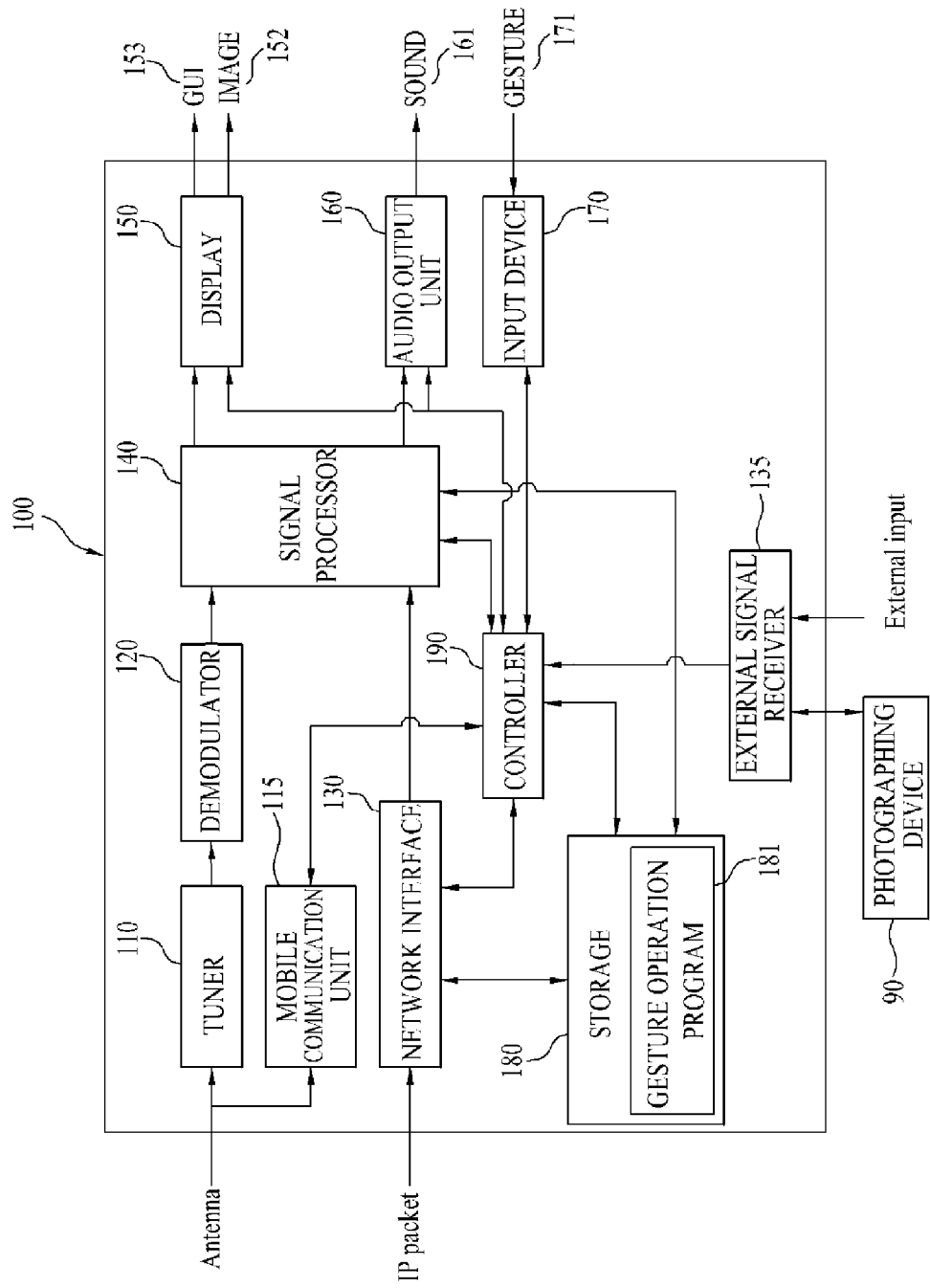
FIG. 1 is a block view illustrating a configuration of an electronic device according to an exemplary embodiment of the present invention.

FIG. 1 is a block view illustrating a configuration of an electronic device according to an exemplary embodiment of the present invention.

In reference to FIG. 1, an electronic device 100 includes a tuner 110, a mobile communication unit 115, a demodulator 120, a network interface 130, a signal processor 140, a display 150, an audio output unit 160, an input device 170, a storage 180, a controller 190 and an external signal receiver 135. The electronic device 100 may be a personal computer system such as a desktop, laptop, tablet and handheld computer. The electronic deice 100 may be a mobile terminal such as a mobile phone, smart phone, digital broadcasting terminal, PDA (Personal Digital Assistants), PMP (Portable Multimedia Player), navigation and the like or a fixed-type electric appliance such as a digital TV and the like.

The tuner 110 selects one of RF (Radio Frequency) broadcasting signals received via an antenna, corresponding to a channel selected by a user, and it converts the selected RF broadcasting signal into a middle frequency signal or a baseband video or audio signal. For example, when the selected RF broadcasting signal is a digital broadcasting signal, the tune 110 converts the selected RF broadcasting signal into a digital IF signal (DIF). When it is an analog broadcasting signal, the tuner 110 converts the selected RF broadcasting signal into an analog baseband video or video signal (CVBS SIF). That is, the tuner 110 may process the digital broadcasting signal or analog broadcasting signal. The analog baseband video or audio signal (CVBS SIF) outputted from the tuner 110 may be inputted to the signal processor 140 directly.

In addition, the tuner 110 may be receive a RF broadcasting with a single carrier according to ATSC (Advanced Television System Committee) or a RF broadcasting signal with a plurality of carriers according to DVB (Digital Video Broadcasting).

An electronic device 100 according to another embodiment of the present invention may include at least two tuners. When the at least two tuners are provided, a second tuner selects one of RF broadcasting signals received via the antenna, which is corresponding to a channel selected by the user, like a first tuner, and the second tuner converts the selected RF broadcasting signal into a middle frequency signal or baseband video or audio signal.

In addition, the second tuner sequentially selects RF broadcasting signals of the received RF signals, which are corresponding to all of the stored broadcasting channels via a channel memory function, and it converts them into the middle frequency signals or baseband video/audio signals. The second tuner may perform conversion of all of the broadcasting channels periodically. Because of that, the electronic device 100 may provide images of broadcasting signals converted by the first tuner and it may provide a thumbnail type of images converted by the second tuner simultaneously. In this case, the first tuner converts a main RF broadcasting signal selected by the user into a middle frequency signal or baseband video/audio signal, and the second tuner sequentially and periodically selects the other RF broadcasting signals except the main RF broadcasting signal and it converts them into middle frequency signals or baseband video/audio signals.

The demodulator 120 receives a digital IF signal (DIF) converted by the tuner 110 and it performs demodulation of DIF. For example, when the digital IF signal outputted from the tuner 110 is an ATSC system, the demodulator 120 performs 8-VBS (8-Vestigial Side Band) demodulation. Alternatively, when the digital IF signal outputted from the tuner 110 is a DVB system, the demodulator 120 performs demodulation of COFDMA (Coded Orthogonal Frequency Division Modulation).

The demodulator 120 may perform channel decoding. For that, the demodulator 120 may include a trellis decoder, a de-interleaver and a Reed-Solomon decoder to perform trellis decoding, de-interleaving and Reed-Solomon decoding.

After performing the demodulation and channel decoding, the demodulator 120 may output a stream signal (TS). At this time, the stream signal may be a signal multiplexed of video, audio and data signals. For example, the stream signal may be MPEG-2 Ts (Transport Stream) multiplexed of MPEG-2 format video signal, Dolby® AC-3 format audio signal. Specifically, MPEG-2 Ts may include 4 byte header and 184 bite payload.

The stream signal outputted from the demodulator 120 may be inputted to the signal processor 140. After performing demultiplexing and signal processing, the signal processor 140 outputs an image to the transparent display 150 and it outputs a sound to the audio output unit 160.

In case of the digital broadcasting receiver having at least two tuners, the corresponding number of demodulators to the at least two tuners may be provided. The demodulators may be provided independently based on ATSC and DVB system.

The mobile communication unit 115 transmits and receives a wireless signal to and from at least one of a base station, an external terminal, a server. The wireless signal may include various types of data according to a speech call signal, video telephony call signal and texture/multimedia message transmitting/receiving.

The network interface 130 receives packets from the network and transmits the received packets to the network. That is, the network interface 130 receives IP packets configured to transport broadcasting data from the service providing server via the network. Here, the broadcasting data includes contents, an update message configured to notify contents updating, metadata, service information, software codes and A/V data. The service information may include service information on a real-time broadcasting service and service information on an internet service. Here, the internet service means a service provided via the internet, for example, a Cod (Content's on Demand) service, YouTube service, an information service for weather, news, community information and search, an entertainment service for a game and karaoke, and a communication service for TV mail and TV SMS (Short Message Service). As a result, the digital broadcasting receiver according to the present invention may include a network TV, web TV and broadband TV. Also, the broadcasting service may include an internet service as well as a broadcasting service provided via terrestrial, satellite and cable.

The controller 190 implements commands and it performs an operation related to the electronic device 100. For example, the controller 190 may control input and output and receiving and processing of data between components of the electronic device 100, using a command searched in the storage 180. The controller 190 may be represented on a single chip, a plurality of chips or a plurality of electric parts. For example, a variety of architectures including an exclusive or embedded processor, a single purpose processor, controller, ASIC and the like may be useable with respect to the controller 190.

The controller 190 implements a computer code together with an operating system and it performs generation and usage of data. The operating system is well-known in the art to which the present invention pertains and description of the operating system will be omitted. For example, the operating system may be Windows®, Unix®, Linux®, Palm OS®, MS-DOS®, Android™ and Mac OS® and the like. The operating system, another computer code and data may exist in the storage connected with the controller 190.

Typically, the storage 180 provides storage for program codes and data used by the electronic device 100. For example, the storage 180 may be represented to be a ROM (Read only Memory), RAM (Random Access Memory), hard-disc drive. The program codes and data may exist in a separable storage medium or they may be loaded or installed on the electronic device 100. Here, the separable storage medium includes a CD-ROM, PC-CARD, memory card, floppy disc, magnetic tape and network component.

The display 150 may put into operation, connected with the controller 190. The display 150 may be represented to be an organic light emitting panel or plasma panel.

The display 150 may display a graphic user interface (GUI) 153 configured to provide an easy interface usable between the user of the electronic device and the operating system or a predetermined application implemented on the operating system. The GUI 153 represents a program, a file and operation options as graphic image. The graphic image may include a window, field, a dialog box, menu, icon, button, curser and scrollbar. Such images may be aligned in a layout defined in advance or they may be generated dynamically to help the user's specific handling. During the operation, the user may select and enable the image to start functions and works related to the variety of graphic images. For example, the user may select a button to implement opening, closing, minimizing and maximizing of a window or an icon to start a specific program.

The input device 170 may be a touch screen disposed on or in front of the display 150. The touch screen may be integral with the display 150 or an independent element. The touch screen may be named as touch screen display. When the touch screen is disposed in front of the display 150, the user may operate the GUI 153 directly. For example, the user may place only his or her finger on an object which will be controlled and there is no one-to-one relation on a touch pad.

The touch pad is placed on another plane, separated from the display 150. For example, the display 150 is typically located on a vertical plane and the touch pad is located in a horizontal plane. This allows usage of the touch pad less intuitive and it is quite difficult, compared with the touch screen. In addition to the touch screen, the input device 170 may be a multipoint input device.

The controller 190 may recognize a gesture 171 applied to the input device 170 and it may control the electronic device 100 based on this gesture 171. Here, the gesture may be defined as predetermined interaction with the input device 170, which is mapped onto at least one specific computing operation. The gesture 171 may be generated by a variety of human fingers, specifically, motion of human fingers. Alternatively, the gesture may be generated by a stylus in addition to the motion of human fingers.

The input device 170 receives the gesture 171 and the controller 190 implements commands configured to perform operations related to the gesture 171. Moreover, the storage 180 may include a gesture operation program 181 which may be a part of the operating system or auxiliary application. The gesture operation program 181 includes a series of commands to recognize generation of the gesture 171 and/or to instruct which step has to be taken in response to the gesture 171 to at least one software agent.

When the user generates one or more gestures, the input device 170 transports gesture information to the controller 190. Using a command transported from the storage 180, specifically, the gesture operation program 181, the controller 190 translates the gesture and it controls each component of the electronic device such as the storage 180, the display 150, the audio output unit 160, the signal processor 140, the network interface 130 and the input device. The gesture 171 may be detected as command for performing operation of an application stored in the storage 180, for modifying the GUI object displayed on the display 150, for modifying data stored in the storage 180 and for performing operation of the network interface 130 and the signal processor. For example, such commands may be related to zooming, panning, scrolling, page turning, rotating, size adjusting, image channel changing, content receiving and internet access. In addition, the commands may be related to starting of a specific program, opening of a file or document, menu viewing, selecting, command implementing, log-on an internet site system, allowing of an identified person to have access to a limited area of a computer system, loading of user profile related to user preference arrangement on a wall paper and/or the like.

A variety of difference gestures may be usable. For example, the gesture may be a single point or multipoint gesture, a static or dynamic gesture, a continuous or segmented gesture, and/or the like. The single point gesture is a gesture performed according to a single touch point. For example, this gesture is performed according to single touch such as a single human finger, palm or stylus. The multipoint gesture is a gesture performed according to multiple points. For example, this gesture is performed according to plural touches such as plural human fingers, human fingers and palm, human fingers and stylus, plural styli and/or combination of them. The static gesture is a gesture having no motion and the dynamic gesture is a gesture having motion. The continuous gesture is a gesture is a gesture performed according to a single stroke and the segmented gesture is a gesture performed according to an independent sequence of steps or strokes.

The object and the touch on the touch screen have a variety of different patterns, typically. For example, a single point gesture on the touch screen includes a down event and a following up event performed at an identical location or almost identical location of the down event. The dynamic gesture on the touch screen includes a down event and at least one dragging event following the down event and an up event following the at least one dragging event.

According to some embodiments, a parameter is used to describe a process in which a human finger approaches to the touch screen display to touch the touch screen display and to recede from the touch screen display. This parameter may be at least one function of the distance between the human finger and the touch screen display, the pressure of the human finger applied to the touch screen display, the touch area between the human finger and the touch screen, the voltage between the human finger and the touch screen, the capacitance between the human finger and the touch screen display and physical parameters.

According to some embodiments, when the size of the parameter between the human finger and the touch screen display (for example, the capacitance) is higher than a predetermined threshold value level, the down event is performed. While the parameter is the predetermined threshold value level or higher, with a curser position corresponding to the human finger moved from a position 'A' to a position 'B', the dragging is performed. When the parameter is lower than the threshold value level, the up event is performed.

The controller 190 may detect each of a menu configuration mode conversion command, a menu mode conversion command, a menu generating object selection command, a menu generating object motion command, a menu generating object drop command, a menu generating object positioning command, a menu object selection command, a menu object motion command, a menu object drop command and a menu object positioning command from related gestures.

When detecting a down event in an area having a menu generating object located therein, the controller 190 may detect a menu generating object selection command. When detecting a down event in an area having a menu object located therein, the controller 190 may detect a menu object selection command. When detecting a dragging event after a menu object or menu generating object is selected, the controller 190 may detect a menu object motion command or menu generating object motion command. When detecting an up event after detecting a menu object motion command or menu generating object motion command, the controller 190 may detect a menu object drop command and menu generating object drop command.

When detecting a down event and a following up event after detecting a menu generating object selection command, the controller 190 may detect a menu generating object positioning command. In addition, when detecting a down event and a following up event after detecting a menu object selection command, the controller may detect a menu object positioning command.

When contact between an object and the touch screen in a menu mode is continued for a preset time period or more, the controller 190 may detect a menu configuration mode conversion command. In addition, when contact between the object and the touch screen in a menu configuration mode is continued for a preset time period, the controller 190 may detect a menu mode conversion command. Here, the area in which contact is generated may be an area in which a menu object, a menu generating object and a service page are not displayed.

When detecting a menu configuration mode conversion command, the controller 190 may control a menu generating object to be displayed on a screen. Related computing operation is mapped onto the menu object and the menu object is related to a specific service page. That is, the menu object represents at least one menu item. The menu generating object is an object to generate the menu object and related computing operation is not mapped onto the menu generating object, not related to a specific service page.

The external signal receiver 135 may provide an interface capable of connecting an external device with the electronic device 100. Here, the external device may be one of various kinds of video/audio output devices including a DVD (Digital Versatile Disk), Blu-ray®, game device, camcorder, computer (notebook) and the like. The electronic device 100 may control a video/audio signal received from the external signal receiver 135 to be displayed and it may store or use a data signal.

In addition, the external device may be a photographing device 90. The photographing device 90 may include a plurality of cameras and it may image a person. The photographing device 90 recognizes a face area of the person and it focuses the face area, to zoom-in, and it images the face area. Here, a human hand shape imaged by the photographing device 100 may be recognized as space gesture. That is, the controller 190 may recognize the imaged hand shape as space gesture and it may implement commands configured to perform operations related to the recognized space gesture. Here, the space gesture may be defined as gesture recognized from an image frame or image received from the photographing device 90, with being mapped onto at least one specific computing operation.

Figure 2:
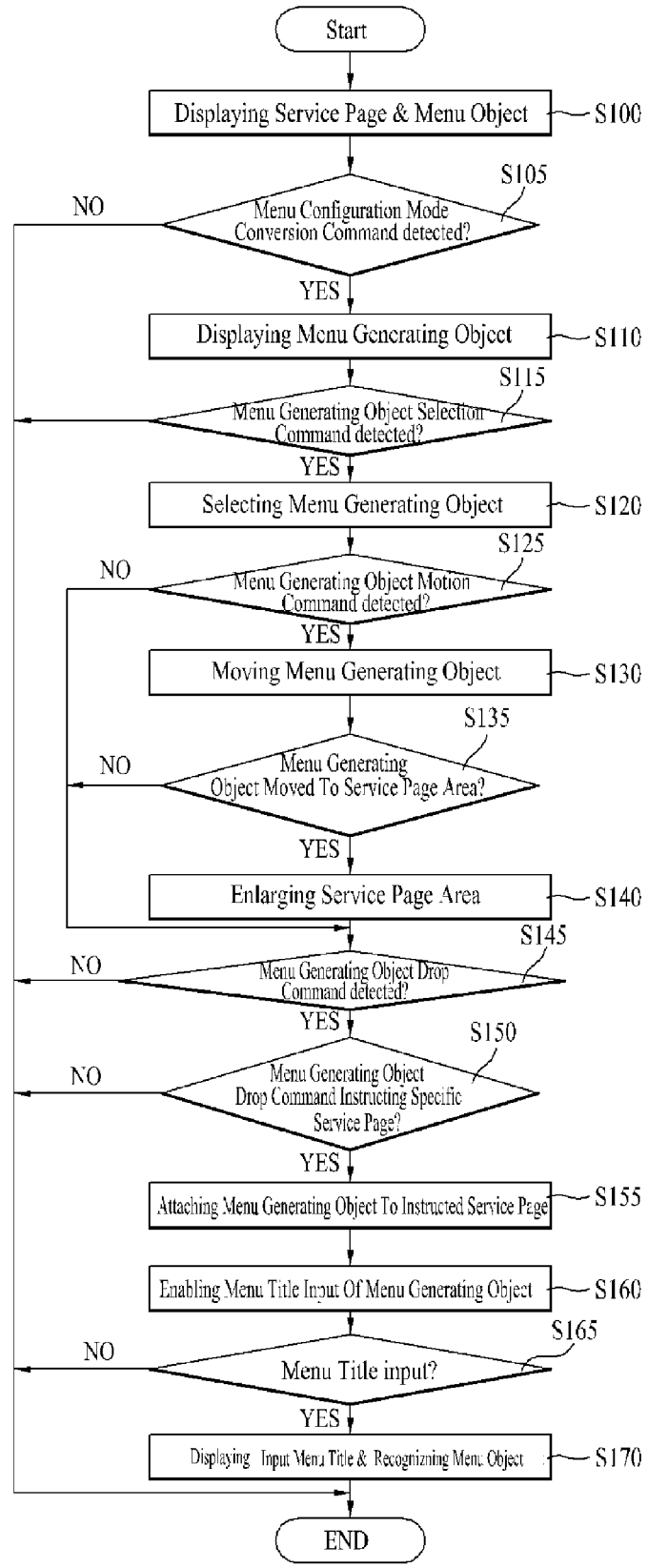
FIG. 2 is a flowchart illustrating a process for performing a method for generating a menu according to the present invention.

FIG. 2 is a flowchart illustrating a process for performing a menu generating method according to an exemplary embodiment of the present invention.

In reference to FIG. 2, the display 150 displays a plurality of service pages and at least one menu object attached to one of the service pages on a screen (S100).

Figure 3:
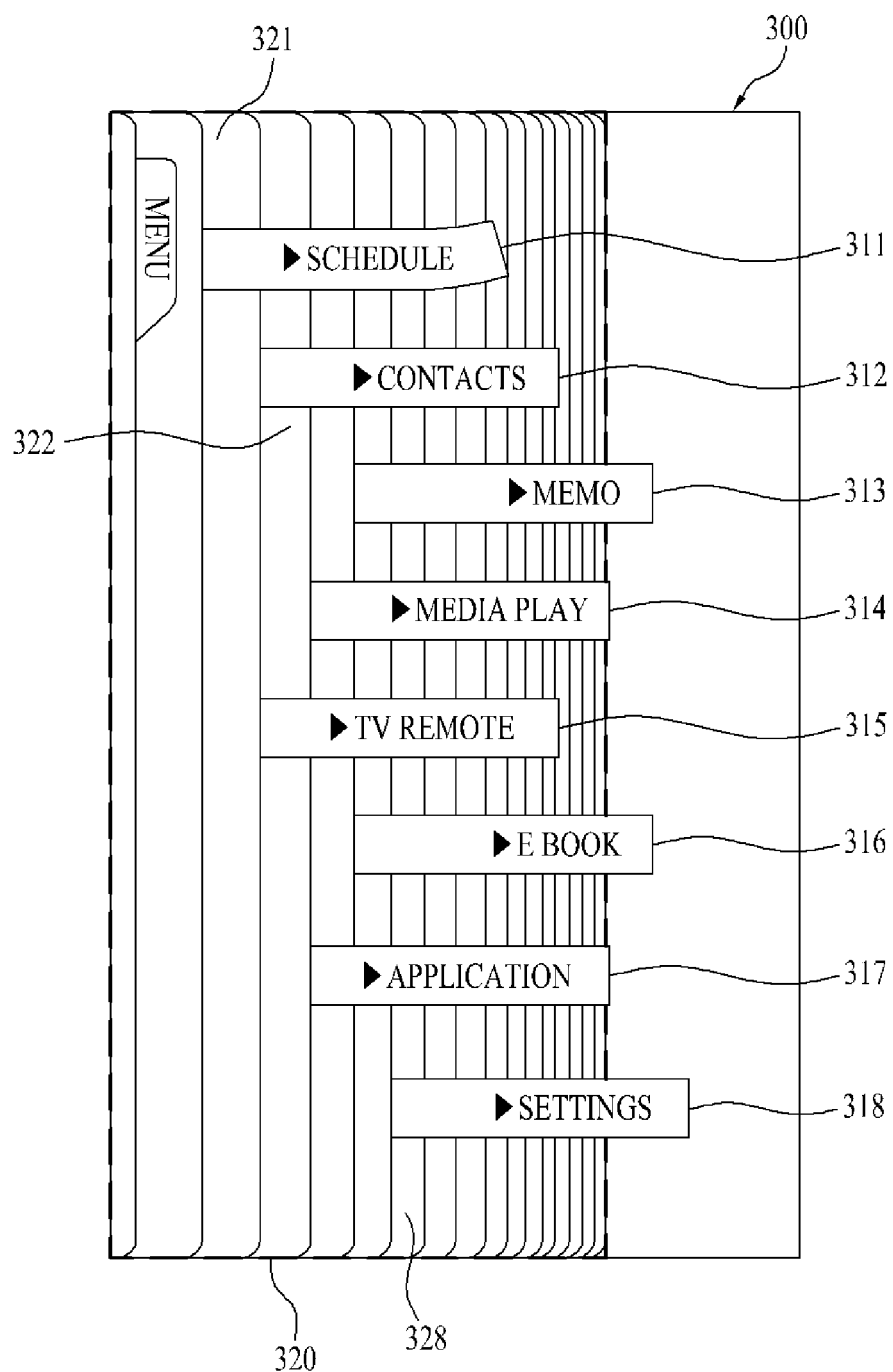
FIG. 3 is a diagram illustrating a screen displaying a main menu according to an embodiment.

FIG. 3 is a diagram illustrating a screen displaying a main menu according to an embodiment.

In reference to FIG. 3, the display 150 may display a screen 300 in the step of S100. The screen 300 is a main menu screen displaying a main menu. The main menu screen may be displayed as initial display after booting is completed. The screen 300 may be displayed when a menu requesting command is detected and it may be displayed when the menu mode conversion command is detected.

The screen 300 displays an area 320 in which menu objects 311, 312, 313, 314, 315, 316, 317 and 318 and service pages are located. Here, the menu objects 311, 312, 313, 314, 315, 316, 317 and 318 are located in specific service pages, respectively. A menu object 311 is located in a service page 321 and a menu object 312 is located in a service page 322 and a menu object 318 is located in a service page 328.

Predetermined areas of the menu objects 311, 312, 313, 314, 315, 316, 317 and 318 are attached to the service pages in which the menu objects are located. Although not shown, an entire area of the menu object may be attached to the service page in which the menu object is located.

As shown on the screen 300, each of the menu objects may be displayed in a label shape and predetermined areas of the service pages may be displayed in a state of being overlapped.

The controller 190 identifies whether the menu configuration mode conversion command is detect (S105). The menu configuration mode conversion command may be recognized by a touch gesture as well as a space gesture.

Figure 4:
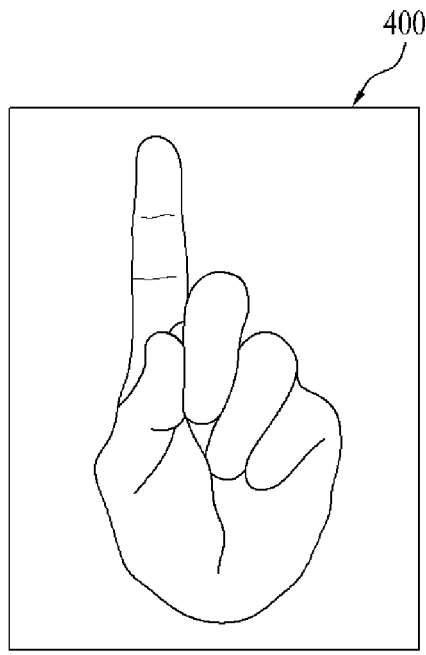
FIG. 4 is a diagram illustrating a screen having a user gesture recognized thereon according to an embodiment.
Figure 5:
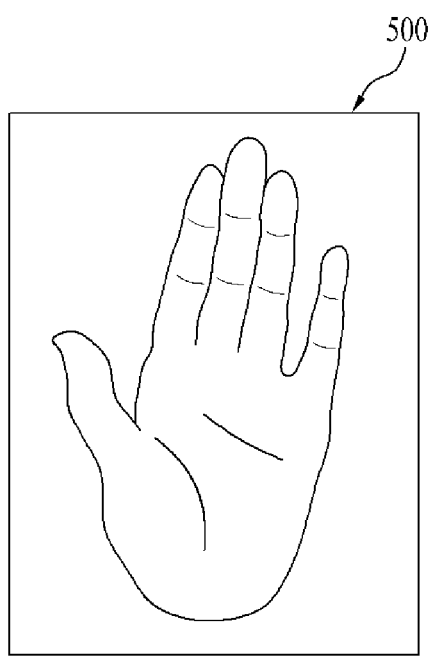
FIG. 5 is a diagram illustrating a screen having a user gesture recognized thereon according to another embodiment.

FIG. 4 is a diagram illustrating a screen having a user gesture recognized thereon according to an embodiment of the present invention and FIG. 5 is a diagram illustrating a screen having a user gesture recognized thereon according to another embodiment.

In reference to FIGS. 4 and 5, when a space gesture 400 is recognized in a menu mode, the controller 190 may identify that a menu configuration mode conversion command is detected. When a space gesture 500 is recognized in a menu configuration mode, the controller 190 may identify that a menu mode conversion command is detected.

When the menu configuration mode conversion command is detected, the display 150 displays a menu generating object on the screen (S110).

Figure 6:
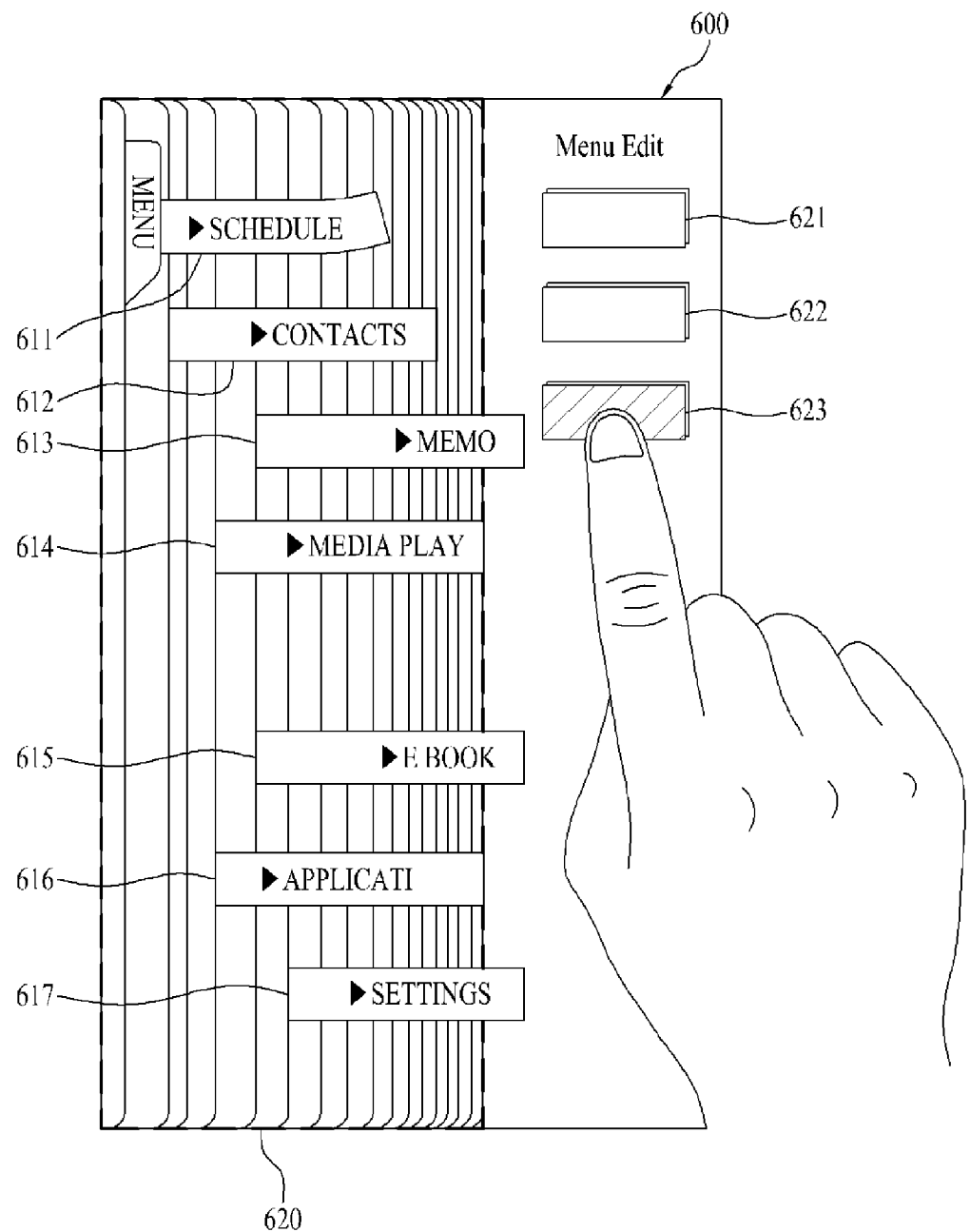
FIG. 6 is a diagram illustrating a screen displaying a menu generating object according to an embodiment.

FIG. 6 is a diagram illustrating a screen displaying a menu generating object according to an embodiment.

In reference to FIG. 6, the display 150 may display a screen 600 in the step of S110. The screen 600 displays an area 620 having the service pages and attached menu objects 611, 612, 613, 614, 615, 616 and 617 located therein, and menu generating objects 621, 622 and 623 located adjacent to the area 620. Each of the menu generating objects 621, 622 and 623 may be displayed in the label shape. In addition, the menu objects 611, 612, 613, 614, 615, 616 and 617, and the menu generating objects 621, 622 and 623, may be displayed in the same shape. Alternatively, the menu generating objects 621, 622 and 623 may be displayed in different colors, respectively.

The controller 190 identifies whether a menu generating object selection command is detected (S115).

When the menu generating object selection command is detected based on the result of the identification, the controller 190 selects a menu generating object instructed by the detected menu generating object selection command (S120). Here, a predetermined mark may be displayed on the selected menu generating object to indicate that the menu generating object is selected like a menu generating object 623.

The controller 190 identifies whether a menu generating object motion command is detected (S125).

When the menu generating object motion command is detected based on the result of the identification, the controller 190 moves the menu generating object based on the detected menu generating object motion command (S130).

Figure 7:
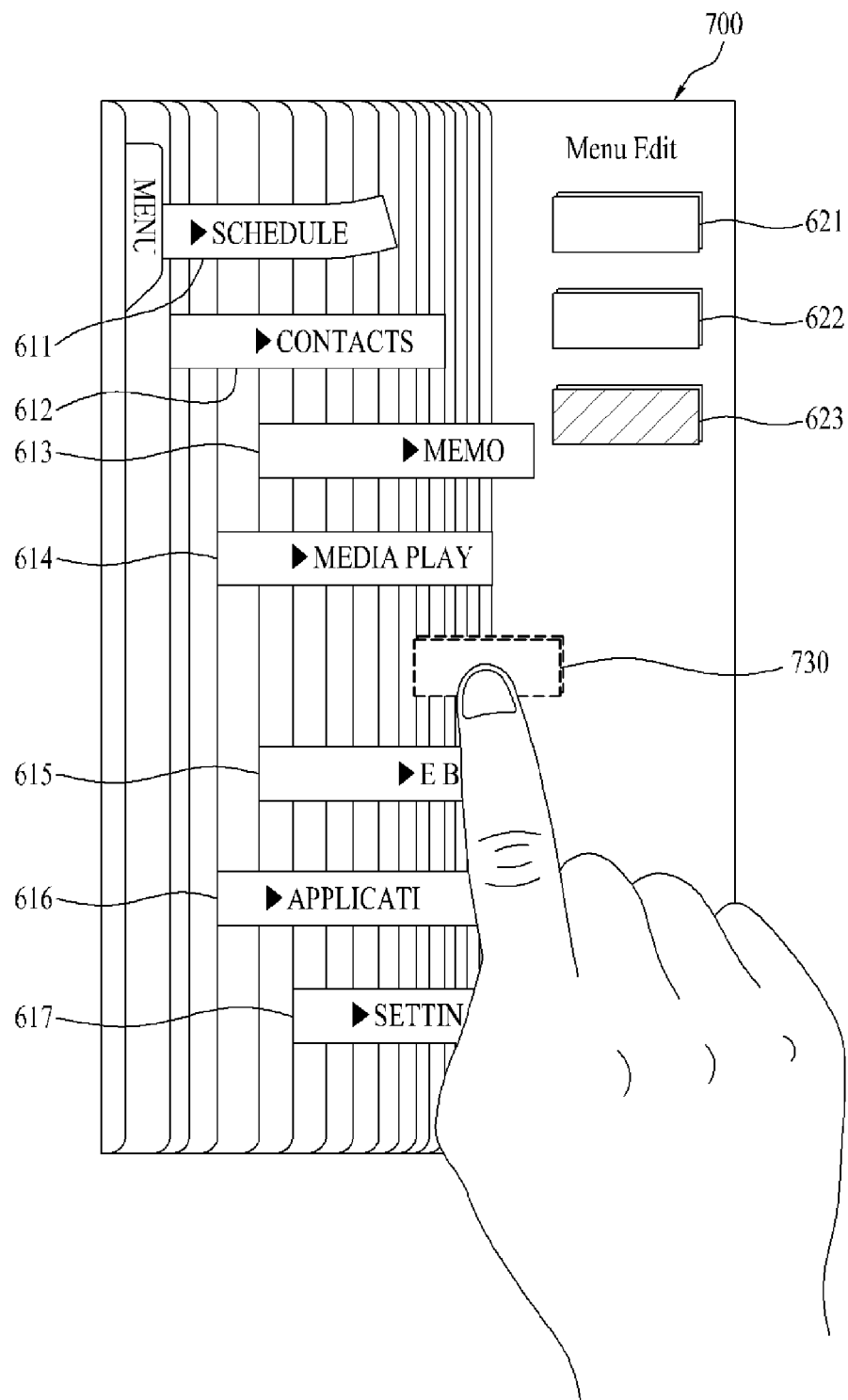
FIG. 7 is a diagram illustrating a screen displaying one of processes for generating the menu according to an embodiment.

FIG. 7 is a diagram illustrating one of screens in a process for generating a menu according to an embodiment.

In reference to FIG. 7, while the step of S130 is performed, the display 150 may display a screen 700 and a menu generating object moved according to the menu generating object motion command may be displayed, such as menu generating object 730 of the screen 700. A mark to indicate this selection may be continuously displayed in the selected menu generating object, such as menu generating object 623 of the screen 700.

The controller 190 identifies whether the moved menu generating object is located on one of the service pages (S135).

When the moved menu generating object is located on at least one service page, the display 150 enlarges and displays an area of the at least one service page (S140). Here, according to an embodiment, the display 150 may enlarge an area of the service page having the moved menu generating object located thereon. According to another embodiment, the display 150 may enlarge an entire area of the service pages. Because of that, the user may select the service page having the menu generating object located thereon without any difficulties.

The controller identifies whether a menu generating object drop command is detected (S145).

When the menu generating object drop command is detected, the controller 190 identifies whether the menu generating object drop command instructs a specific service page (S150). Here, the service page instructed by the menu generating object drop command may be a service page located in a point having an up event of a gesture mapped onto the menu generating object drop command. If the menu generating object drop command does not instruct a specific service page, a screen before the menu generating object is selected may be displayed. In other words, if the up event included in the gesture mapped onto the menu generating object drop command is not generated in the service page, the screen before the menu generating object is selected.

When the menu generating object drop command instructs a specific service page, the controller 190 attaches the moved menu generating object to the service page having the menu generating object drop command detected therein (S155)

Figure 8:
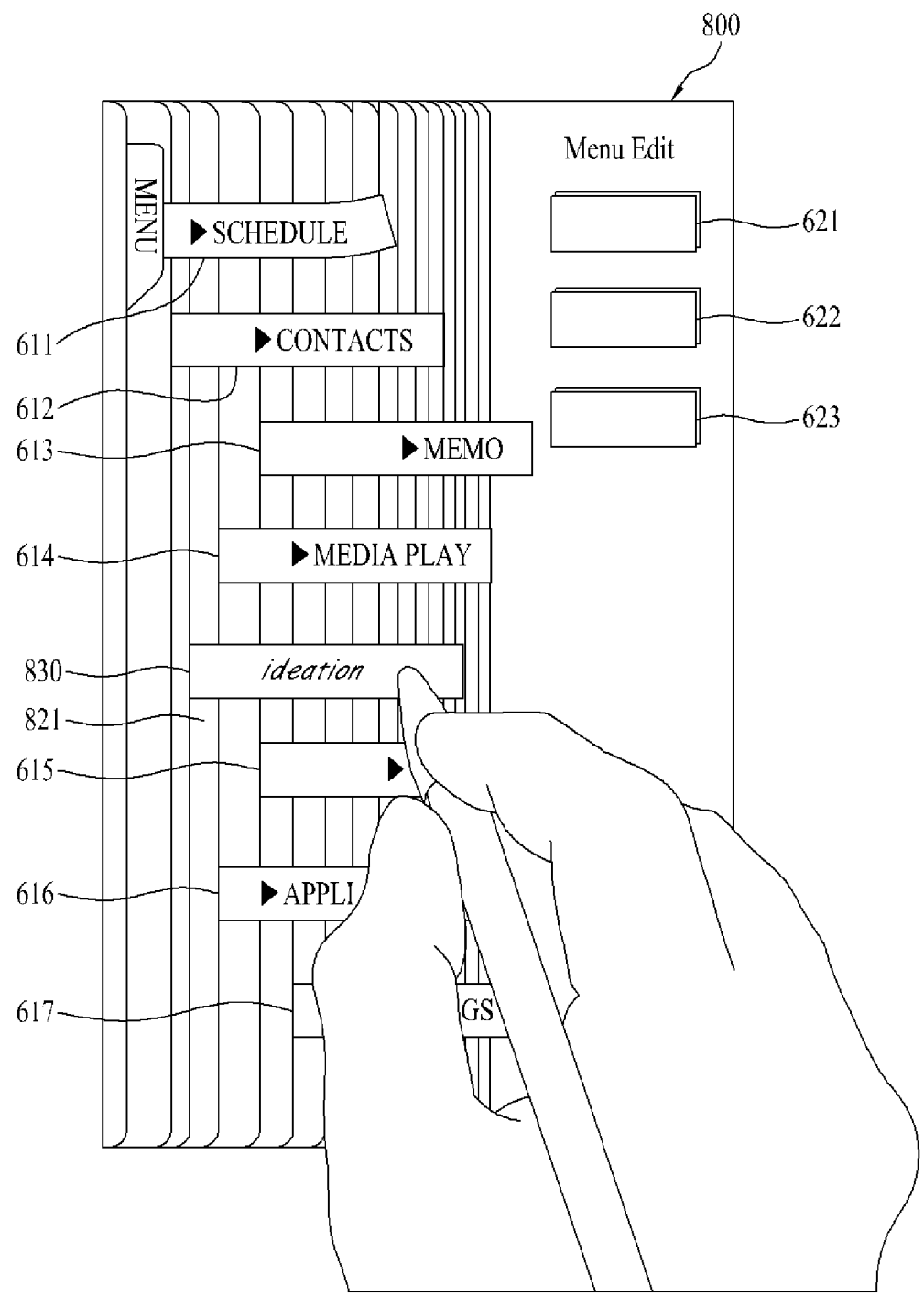
FIG. 8 is a diagram illustrating a screen displaying another one of the processes according to an embodiment.

FIG. 8 is a diagram illustrating another screen displaying a process for generating a menu according to an embodiment.

In reference to FIG. 8, a screen 800 displays a state of a moved menu generating object 830 attached to a service page 821. The display 150 may display a screen displaying the moved menu generating object attached to the service page instructed by the menu generating object drop command in the step of S155, like the screen 800.

The controller 190 enables menu title input for the menu generating object (S160). Like the screen 800, the user may input a menu title of a menu object which will be generated by a method of writing specific letters.

The controller 190 identifies whether the menu title is inputted (S165). Here, this input may be identified according to a down event and it is determined whether a down event is not generated for a predetermined time period after the up event is generated, to identify completion of the input based on the result of the determination. That is, the controller 190 processes that the input of the menu title is completed, if no down event is generated for a predetermined time period.

When the menu title is inputted, the display 150 displays the input menu title on the menu generating object and the controller recognizes the menu generating object as menu object (S170). According to an example of the displayed input menu title, a menu object 830 of the screen 800 has a menu title 'ideation'.

Although not shown in the drawings, the interface method for configuring the menu according to the present invention may include steps configuring a menu object. As follows, the steps will be described.

The controller 190 identifies whether a menu object motion object is detected.

When the menu object motion command is detected, the controller 190 moves the menu object according to the detected menu object motion command.

The controller 190 identifies whether a menu object drop command is detected.

When the menu object drop command is detected, the controller 190 identifies whether the detected menu object drop command is detected on one of the plural service pages. If the menu object drop command is not detected on the service page, it returns to a state before the menu object motion command may be detected or the moved menu object may be deleted.

When the menu object drop command is detected on the one of the plural service pages, the controller 190 attaches the moved menu object to the service page having the menu object drop command detected thereon.

Figure 9:
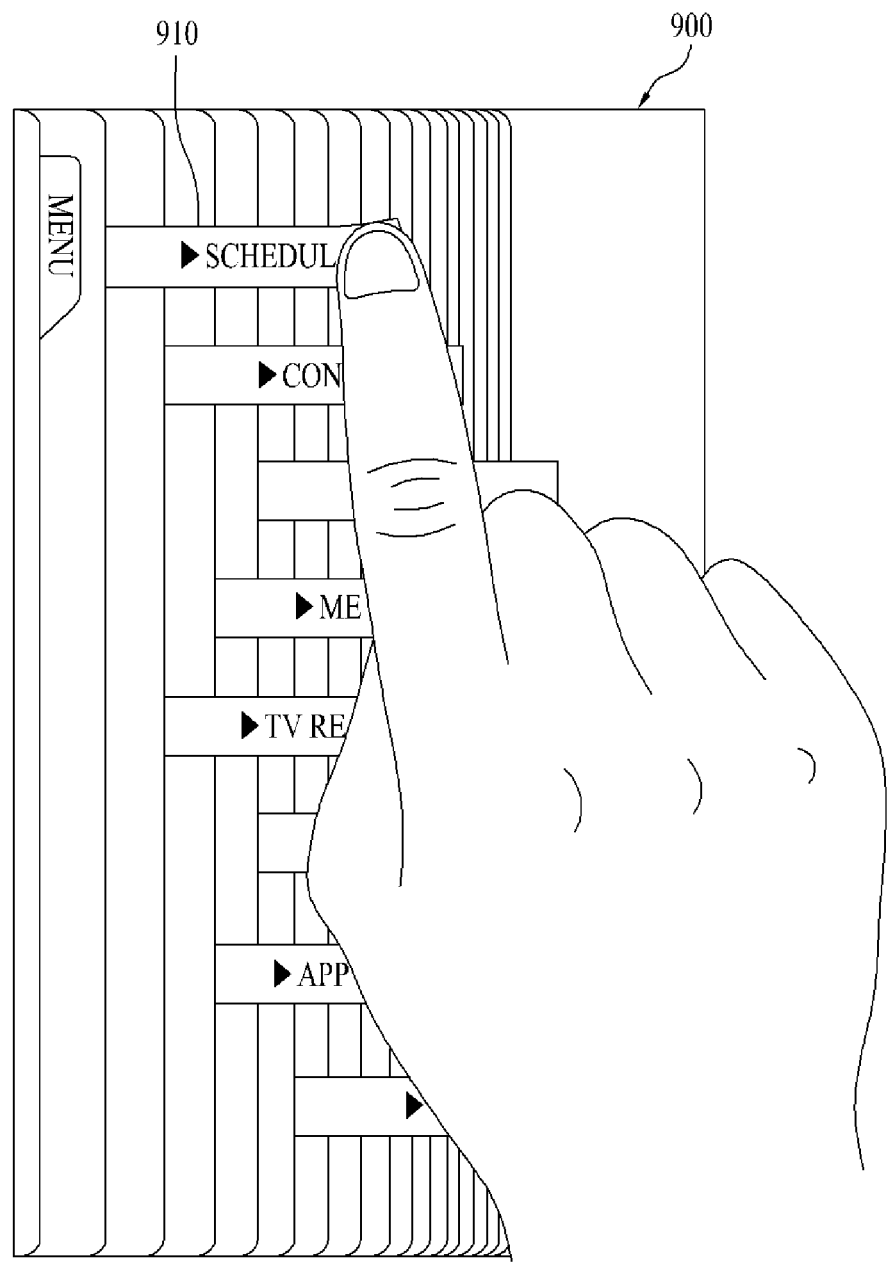
FIG. 9 is a diagram illustrating a screen having a main menu selected thereon according to an embodiment.

FIG. 9 is a diagram illustrating a screen displaying that a main menu is selected according to an embodiment.

In reference to FIG. 9, a screen 900 is one of screens examples displayed in a menu mode. When a down event is detected in an area having a menu object 910 located therein for a preset time period, a sub-menu list listing sub-menu items of the menu object 910 may be displayed.

When a down event is detected for a less time period than a preset time period, a service page related to the menu object 910 may be displayed in a full screen.

Figure 10:
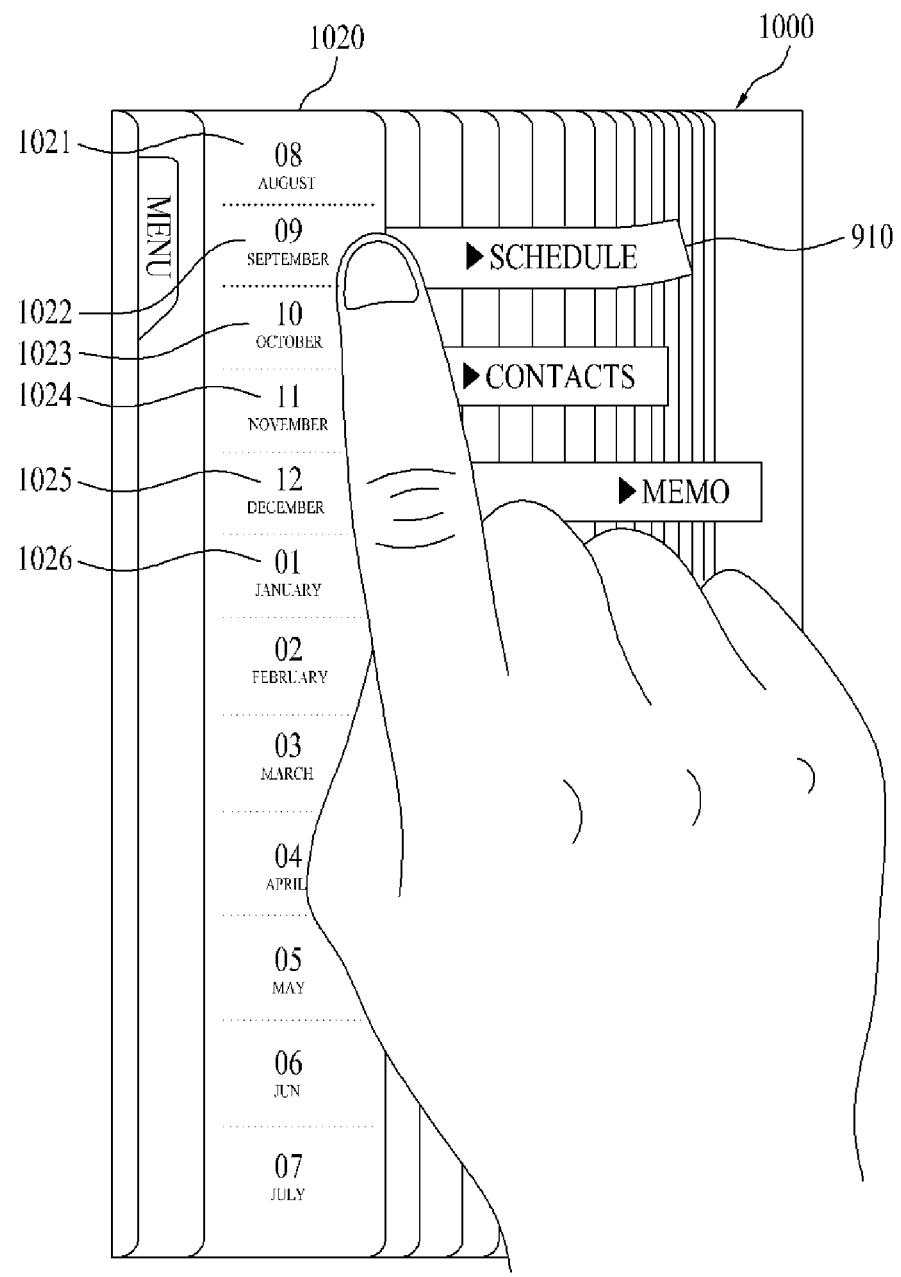
FIG. 10 is a diagram illustrating a screen displaying a sub-menu according to an embodiment.

FIG. 10 is a diagram illustrating a screen displaying the sub-menu according to an embodiment.

In reference to FIG. 10, the sub-menu list may be displayed in a page type, like a sub-menu list 1020, or a predetermined type attached to the menu object 910. The sub menu list 1020 includes sub-menus 1021, 1022, 1023, 1024, 1025 and 1026.

Each of the sub-menus included in the sub-menu list may be related to a specific service page. When a sub-menu is selected, a full screen of a service page related to the selected sub-menu may be displayed. For example, when the service menu 1021 is selected, a service page of 'August 1' may be displayed. The service page of 'August 1' may display schedule information of August 1.

Figure 11:
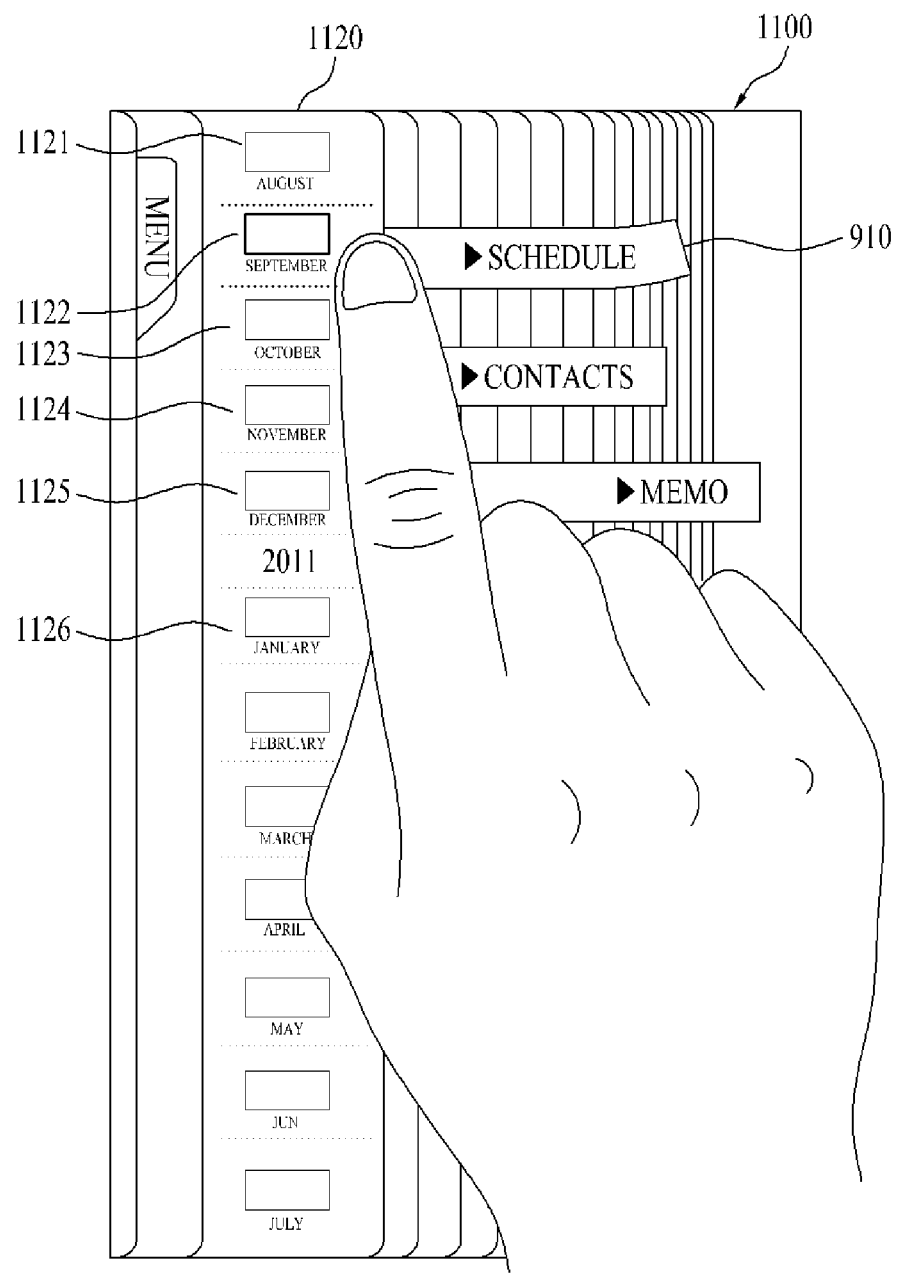
FIG. 11 is a diagram illustrating a screen displaying a sub-main according to another embodiment.

FIG. 11 is a diagram illustrating a screen displaying a sub-menu according to another embodiment.

In reference to FIG. 11, a sub-menu list 1120 may include sub-menus 1121, 1122, 1123, 1124, 1125 and 1126 displaying thumbnail images. The thumbnail images may be automatically set according to default values and they may be changeable according to the user's command.

Figure 12:
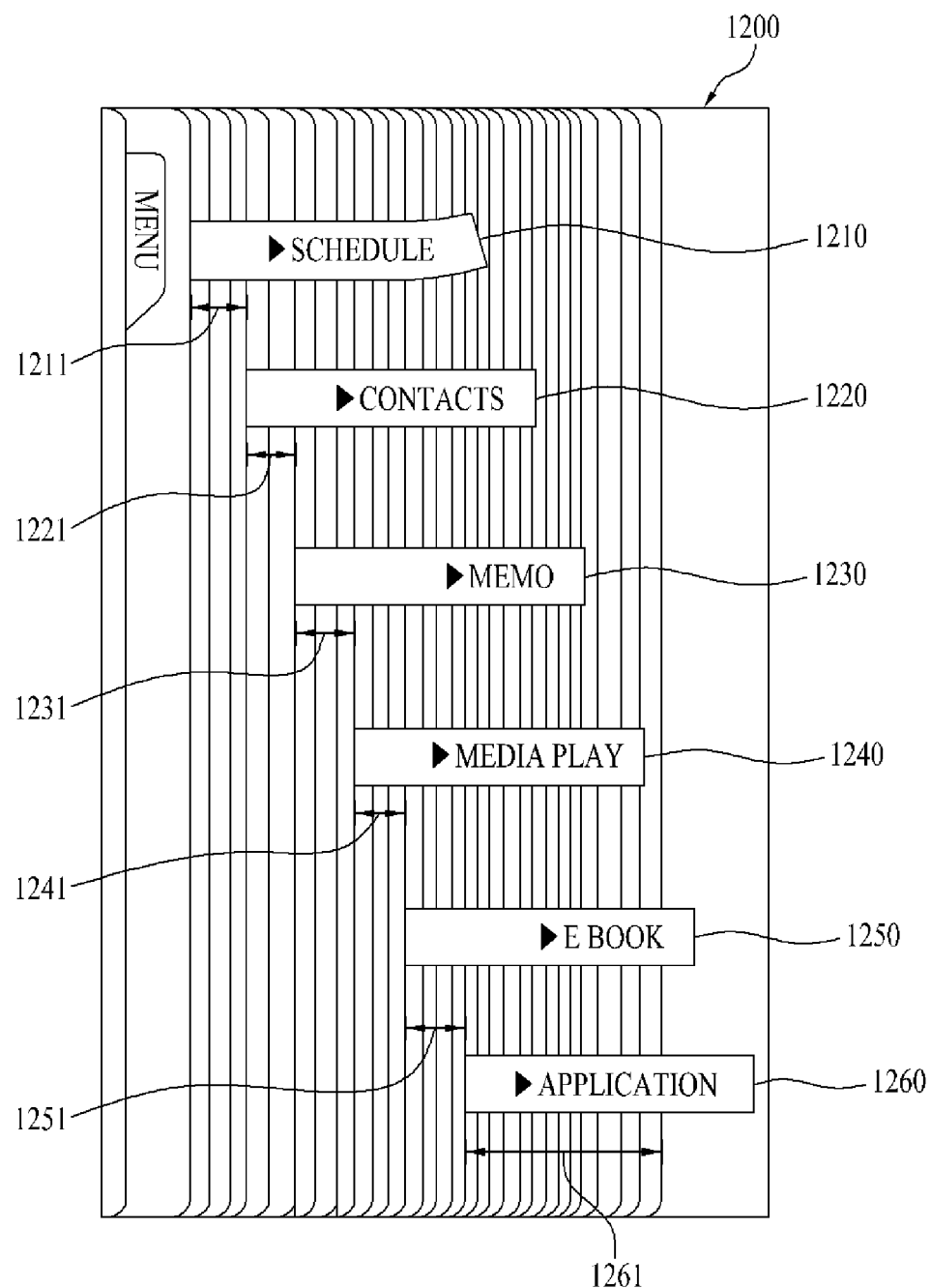
FIG. 12 is a diagram illustrating a screen displaying a main-menu according to a further embodiment.

FIG. 12 is a diagram illustrating a screen displaying a main-menu according to another embodiment.

In reference to FIG. 12, the volume of each service page may be increased according to information or the quantity of contents related to a menu object. Service pages related to a menu object 1210 forms a volume 1211 and service pages related to a menu object 1220 forms a volume 1221 and service pages related to a menu object 1230 forms a volume 1231. Also, service pages related to a menu object 1240 forms a volume 1241 and service pages related to a menu object 1250 forms a volume 1251 and service pages related to a menu object 1260 forms a volume 1261.

Figure 13:
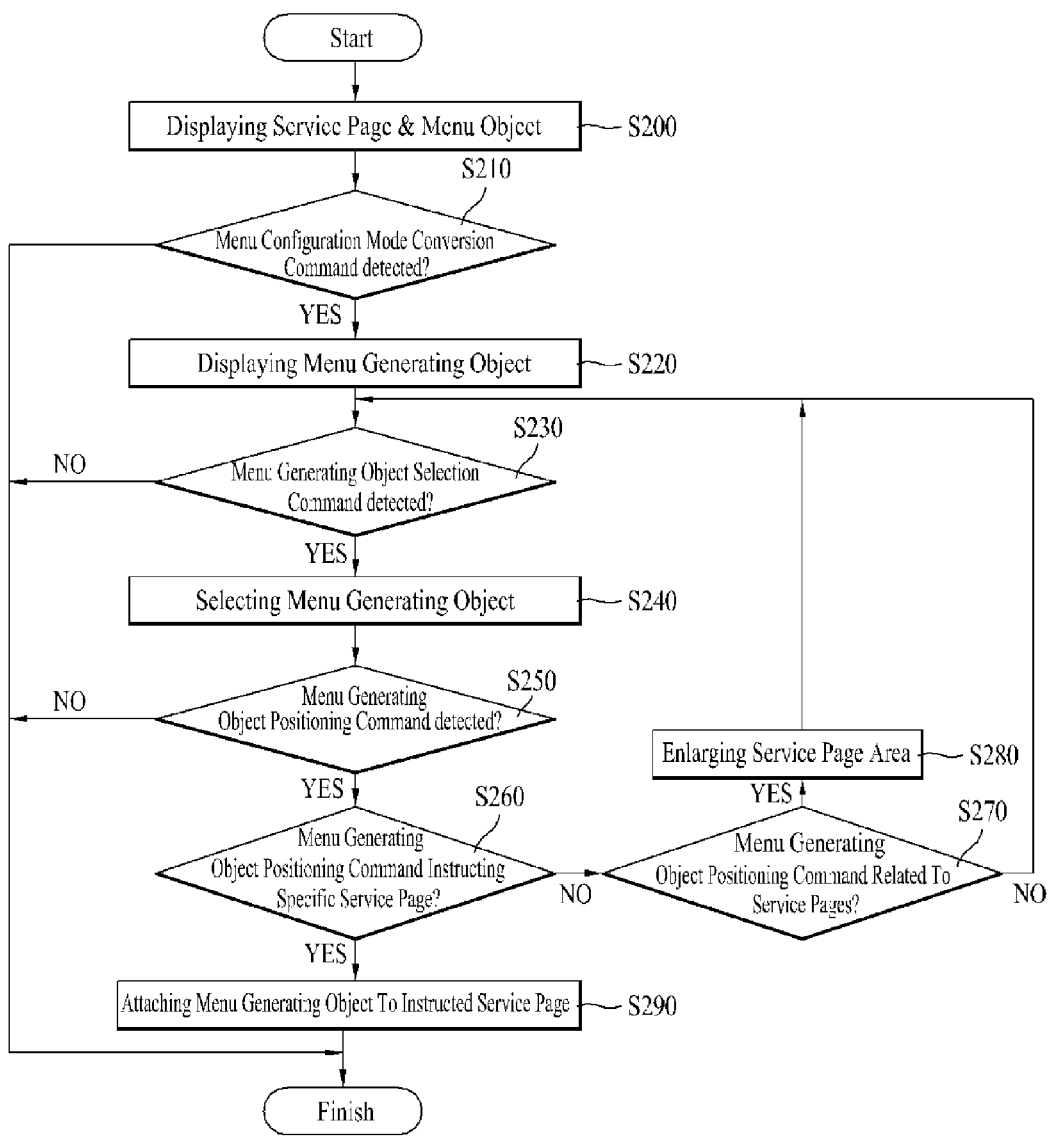
FIG. 13 is a flowchart illustrating a process for performing a menu generating method according to an exemplary embodiment of the present invention.

FIG. 13 is a flowchart illustrating a process for performing a menu generating method according to another exemplary embodiment of the present invention.

In reference to FIG. 13, the display 150 displays a plurality of service pages and at least one menu object attached to one of the service pages on a screen (S200). Here, the display 150 may display a screen 300 shown in FIG. 3.

The controller identifies whether a menu configuration mode conversion command is detected (S210). The menu configuration mode conversion command may be recognized by a space gesture as well as a touch gesture.

When the menu configuration mode conversion command is detected, the display 150 displays a menu generating object on the screen (S220).

Figure 14:
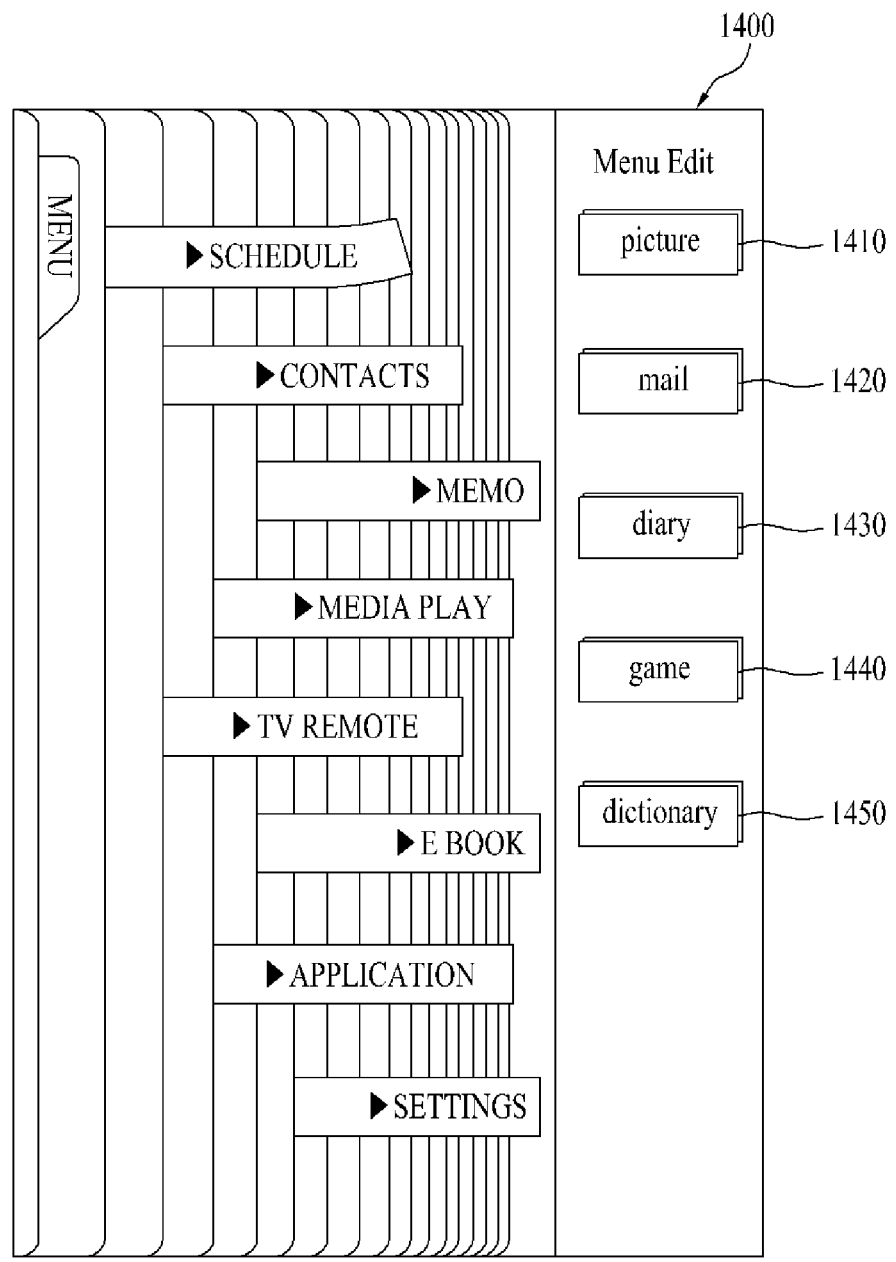
FIG. 14 is a diagram illustrating a screen displaying a menu generating object according to another embodiment.

FIG. 14 is a diagram illustrating a screen displaying a menu generating object according to another embodiment.

In reference to FIG. 14, the display 150 may display a screen 1400 in the step of S220. The screen 1400 displays service pages, a menu object and menu generating objects 1410, 1420, 1430, 1440 and 1450. each of the menu generating objects 1410, 1420, 1430, 1440 and 1450 includes 'picture', 'main', 'diary', 'game' and 'dictionary'. Because of that, the user may generate a menu object by using the menu generating objects 1410, 1420, 1430, 1440 and 1450, without inputting an auxiliary menu title.

The controller 190 identifies whether a menu generating object selection command is detected (S230).

When the menu generating object selection command is detected, the controller 190 selects a menu generating object (S240).

Figure 15:
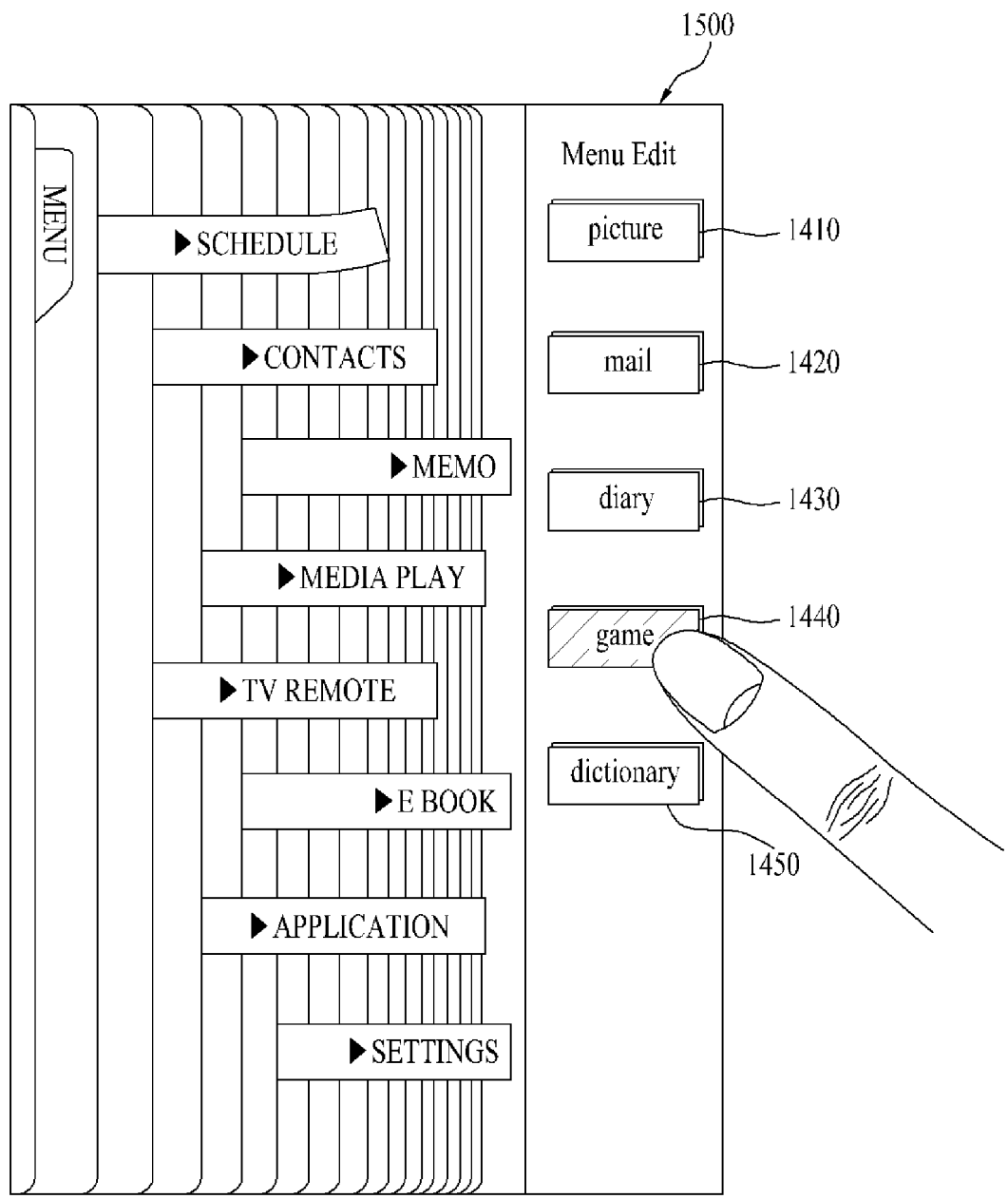
FIG. 15 is a diagram illustrating one of screens displaying a process for generating a menu according to another embodiment.

FIG. 15 is a diagram illustrating a screen displaying a process of generating a menu according to another embodiment.

In reference to FIG. 15, the display 150 may display a screen 1500 in the step of S240. A mark is displayed in a selected menu generating object 1440 on the screen 1500 to display this selection.

The controller 190 identifies whether a menu generating object positioning command is detected (S250).

When the menu generating object positioning command is detected, the controller 190 identifies whether the menu generating object positioning command instructs a specific service page (S260). Here, the service page instructed by the menu generating object positioning command may be a service page located in a point in which a down event included in a gesture mapped on to the menu generating object positioning command is generated.

Figure 16:
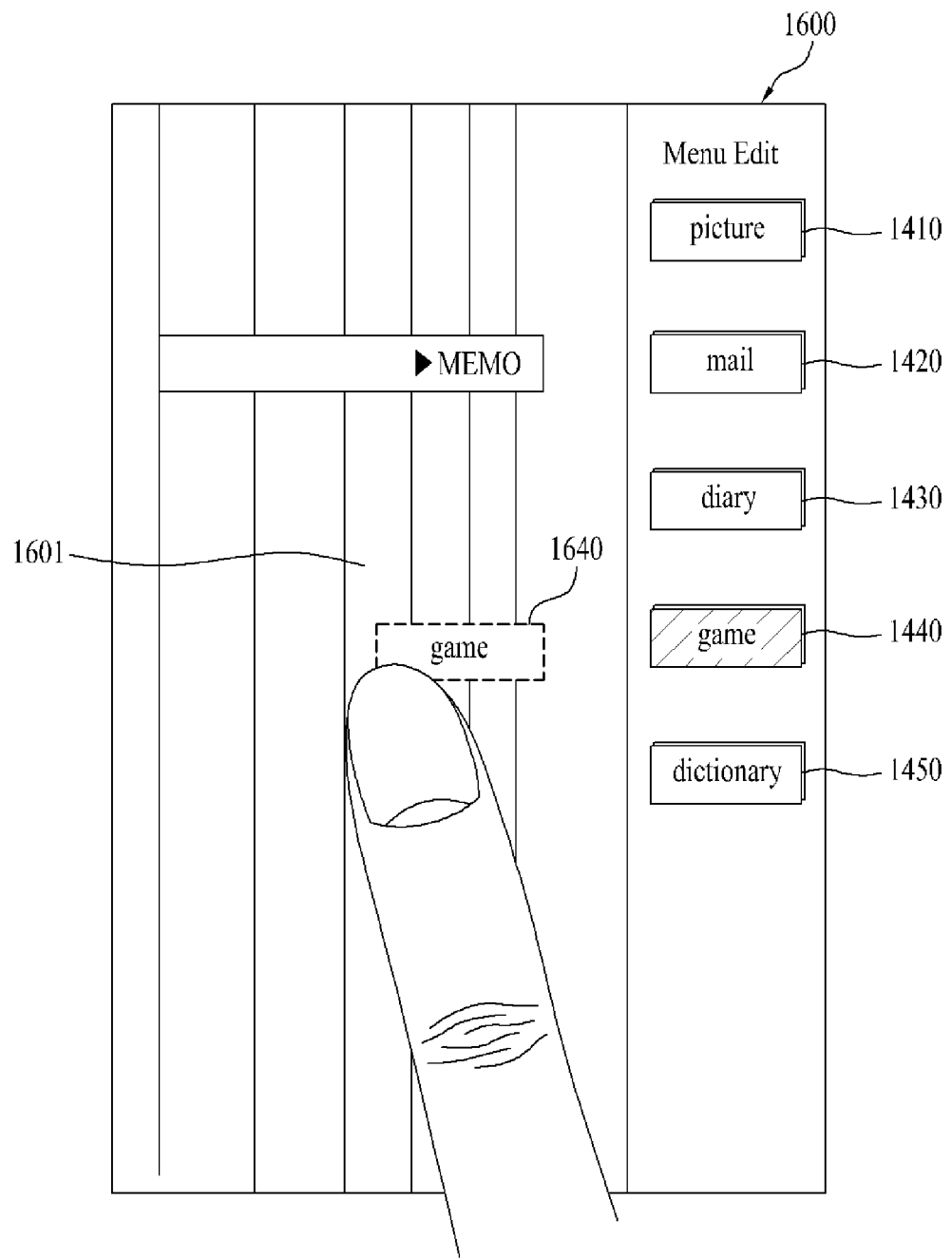
FIG. 16 is a diagram illustrating another one of screens displaying the process for generating the menu according to the embodiment.

FIG. 16 is a diagram illustrating another screen displaying the menu generating process according to another embodiment.

In reference to FIG. 16, the display may display a screen 1600 in the step of S260. The screen 1600 is a screen displayed when a down event is detected on a service page 1601, in a state of a menu generating object being selected. A menu generating object 1640 is displayed on a service page 1601 of the screen 1600.

If the menu generating object positioning command does not instruct a specific service page, the controller 190 identifies whether the menu generating object positioning command is related to a plurality of service pages (S270).

When the menu generating object positioning command is related to the plurality of the service pages, the controller 190 controls a service page area to be enlarged (S280). According to an embodiment, the controller 190 may control an area of the service page related to the menu generating object positioning command to be enlarged. According to another embodiment, the controller 190 may control an entire area of the service page to be enlarged. Because of that, the user may select a service page in which the menu generating object will be positioned more accurately and more smoothly.

If the menu generating object positioning command is detected in an area out of the service page area, a screen before the menu generating object is selected may be displayed.

If the menu generating object positioning command instructs a specific service page, the controller 190 controls the selected menu generating object to be attached to the service page instructed by the menu generating object positioning command (S290).

Figure 17:
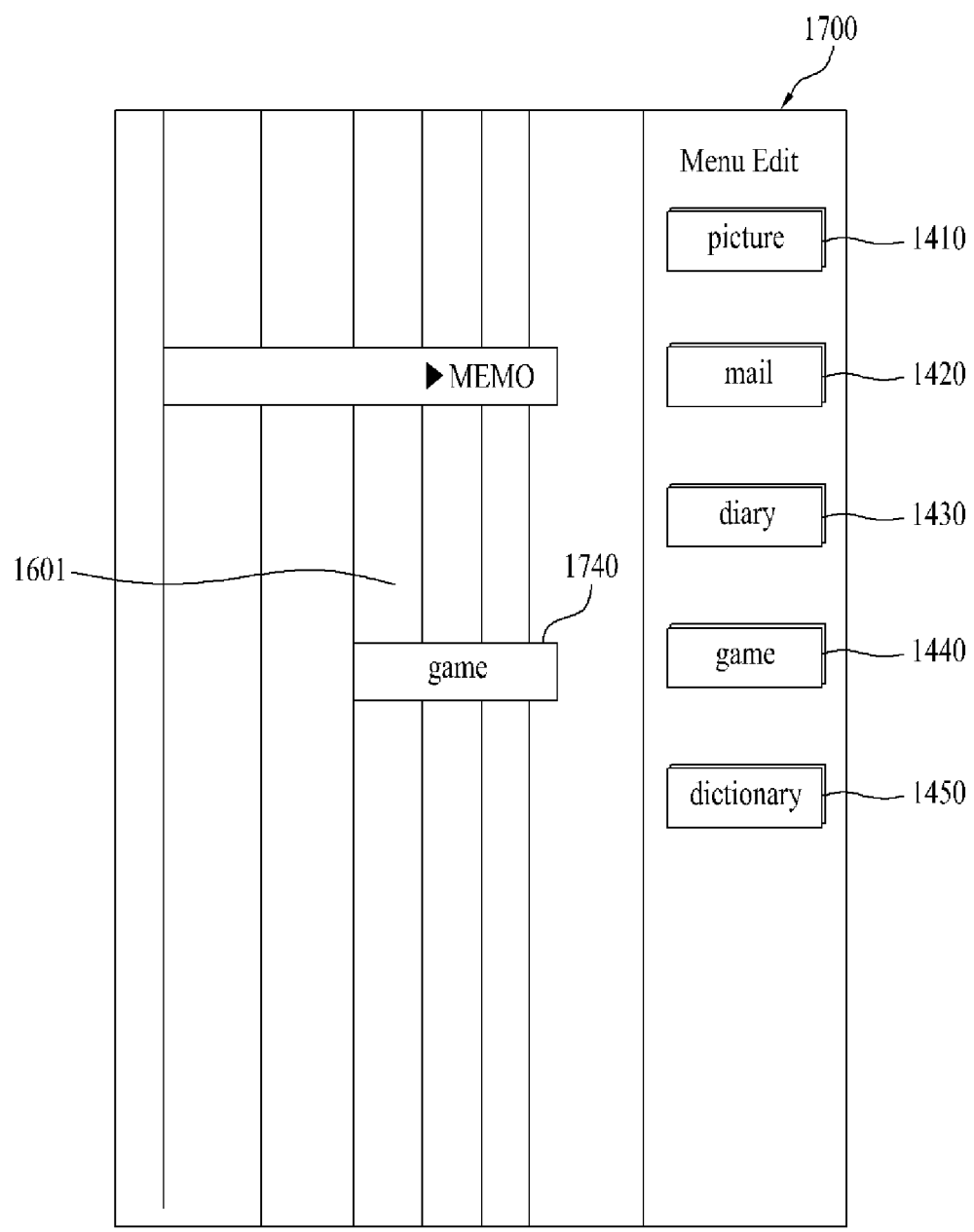
FIG. 17 is a diagram illustrating a further one of screens displaying the process for generating the menu according to the embodiment.

FIG. 17 is a diagram illustrating another screen displaying the menu generating process according to another embodiment.

In reference to FIG. 17, the display 150 may display a screen 1700 in the step of S290. The screen 1700 displays a menu object 1740 attached to a service page 1601. Here, the menu object 1740 is generated by a menu generating object 1640 attached to the service page 1601.

The present invention may be embodied as code readable by a computer in a recording medium readable by a computer. The recording medium includes all kinds of recording devices capable of storing data readable by a computer device. For example, the recording medium readable by the computer may be a ROM, RAM, CD-ROM, magnetic tape, floppy disk, optical data storing device, and it may be embodied as a carrier wave type (for example, transmission via internet). The recording medium readable by the computer may be distributed in a computer unit connected via a network and a code readable by the computer in distribution may be stored in the recording medium to be implemented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An interface method for generating and configuring a menu on a screen of an electronic device, the method comprising:
   when a contact between an object and the screen in a touch mode is continued for at least a predetermined time period, detecting a menu configuration mode conversion command to change a configuration of at least one of a plurality of service pages displayed in an area of the screen of the electronic device, wherein at least a portion of each of a plurality of menu objects is attached to a respective one of the plurality of service pages and when a particular menu object is touched for a preset-time period, a sub-menu list having each sub-menu related to a specific service page is displayed;
   displaying, on the screen, adjacent to the area, a plurality of menu generating objects in response to the detected menu configuration mode conversion command;
   receiving a menu generating object selection command;
   selecting one of the plurality of menu generating objects as instructed by the menu generating generation-object selection command;
   receiving a menu generating object motion command to move the selected menu generating object;
   moving the selected menu generating object onto one of the plurality of service pages in the area in response to the received menu generating object motion command;
   enlarging an area of at least the one service page on which the moved menu generating object is located;
   receiving a menu generating object drop command; and
   attaching the moved menu generating object to a particular one of the plurality of service pages if instructed to do so by the menu generating object drop command.

2. The interface method of claim 1, further comprising:
   enlarging the area in which the plurality of service pages and the plurality of menu objects are located.

3. The interface method of claim 1, further comprising:
   if the menu generating object drop command does not instruct attaching the moved menu generating object to a particular one of the plurality of service pages, displaying the moved menu generating object at a location on the screen where the moved menu generating object was originally located before the moving.

4. The interface method of claim 1, further comprising:
   receiving a menu title input for the moved menu generating object; and
   recognizing the moved menu generating object as a menu object when the menu title input is received.

5. The interface method of claim 1, wherein the plurality of menu objects and the plurality of menu generating objects are displayed in a label shape.

6. The interface method of claim 1, wherein the plurality of service pages are partially overlapped with each other.

7. The interface method of claim 1, wherein a sub-menu list listing sub-menu items of the plurality of menu objects is displayed when a down event is detected at an area having at least one menu object located therein for a preset time period.

8. The interface method of claim 1, wherein contents related to a particular one of the plurality of menu objects are displayed when a down event is detected at an area of the particular menu object.

9. The interface method of claim 1, wherein the number of the plurality of service pages located between two of the plurality of menu objects is increased or decreased according to increase or decrease of information or a quantity of contents related to the plurality of menu objects.

10. The interface method of claim 1, further comprising:
    receiving a menu object motion command to move a particular menu object among the plurality of menu objects attached to one of the plurality of service pages;
    moving the particular menu object in response to the menu object motion command;
    receiving a menu object drop command on a specific service page among the plurality of service pages; and
    attaching the moved menu object to a specific service page in response to the menu object drop command.

11. The interface method of claim 10, further comprising:
    deleting the moved menu object when the menu object drop command is detected at an area outside of the plurality of service pages.

12. An electronic device, comprising:
    a display;
    at least one input device configured to receive commands; and
    a controller in communication with the display and the at least one input device, the controller configured to perform operations associated with commands received by the input device, the operations configured to:
        detect a menu configuration mode conversion command to change a configuration of at least one of a plurality of service pages displayed in an area of the display of the electronic device, when a contact between an object and the display in a touch mode is continued for at least a predetermined time period, wherein at least a portion of each of a plurality of menu objects is attached to a respective one of the plurality of service pages and when a particular menu object is touched for a preset-time period, a sub-menu list having each sub-menu related to a specific service page is displayed;

display a plurality of menu generating objects adjacent to the area by the display in response to the detected menu configuration mode conversion command to change a configuration of at least one of the plurality of service pages;

select one of the plurality of menu generating objects as instructed by a menu generating object selection command received by the at least one input device;

move the selected menu generating object onto one of the plurality of service pages in the area in response to the at least one input device receiving a menu generating object motion command;

enlarge an area of at least the one service page on which the moved menu generating object is located; and attach the moved menu generating object to a particular one of the plurality of service pages if instructed to do so by a menu generating object drop command received by the at least one input device.

13. The electronic device of claim 12, wherein the area in which the plurality of service pages and the plurality of menu objects are located is enlarged.

14. The electronic device of claim 12, wherein if the menu generating object drop command does not instruct attaching the moved menu generating object to a particular one of the plurality of service pages, the moved menu generating object is displayed on the display at a location where the moved menu generating object was originally located before the moving.

15. The electronic device of claim 12, wherein the moved menu generating object is recognized as a menu object when a menu title input is received by the at least one input device.

16. The electronic device of claim 12, wherein the plurality of menu objects and the plurality of menu generating objects are displayed in a label shape.

17. The electronic device of claim 12, wherein the plurality of service pages are partially overlapped with each other.

18. The electronic device of claim 12, wherein content related to a particular one of the plurality of menu objects are displayed when a down event is detected at an area of the particular menu object and the down event is released prior to the preset time period.

19. The electronic device of claim 12, wherein the number of the plurality of service pages located between two of the plurality of menu objects is increased or decreased according to increase or decrease of information or a quantity of contents related to the plurality of menu objects.

20. The electronic device of claim 12, further comprising:
a storage in communication with the controller,
wherein the storage includes a gesture operation program,
wherein the input device is further configured to transport gesture information to the controller, and
wherein the controller is further configured to translate the gesture information using the gesture operation program to perform operations associated with the display of the area in which the plurality of service pages and the plurality of menu objects are located, and the plurality of menu generating objects adjacent to the area.

21. An interface method for generating and configuring a menu on a screen of an electronic device, the method comprising:
when a contact between an object and the screen in a touch mode is continued for at least a predetermined time period, detecting a menu configuration mode conversion command to change a configuration of at least one of a plurality of service pages displayed in an area of the screen of the electronic device, wherein at least a portion of each of a plurality of menu objects is attached to a respective one of the plurality of service pages and when a particular menu object is touched for a preset-time period, a sub-menu list having each sub-menu related to a specific service page is displayed;

selecting one of a plurality of menu generating objects displayed on the screen of the electronic device adjacent to the area;

moving the selected menu generating object onto one of the plurality of service pages in the area;

enlarging an area of at least the one service page on which the moved menu generating object is located; and either attaching the moved menu generating object to a particular one of the plurality of service pages, or displaying the moved menu generating object at a location on the screen where the moved menu generating object was originally located before the moving.

* * * * *